Feb. 22, 1955  C. GAUDIN  2,702,610
SHOCK ABSORBER FOR VEHICLES
Filed Jan. 15, 1954
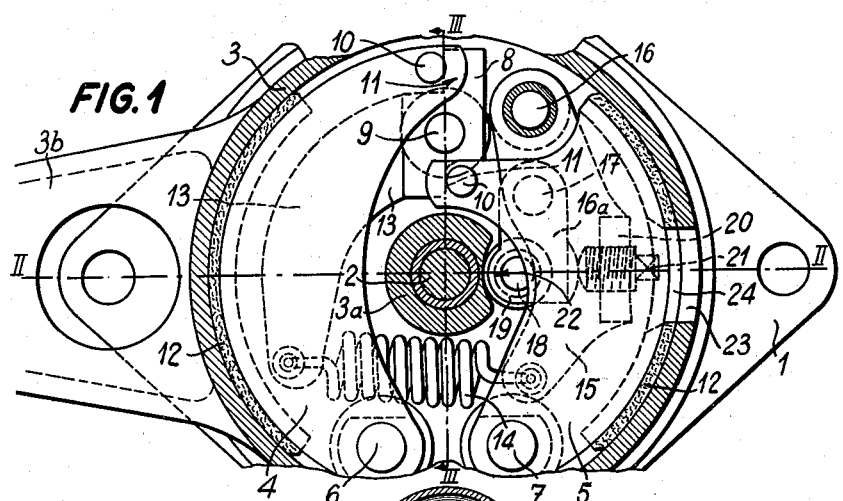
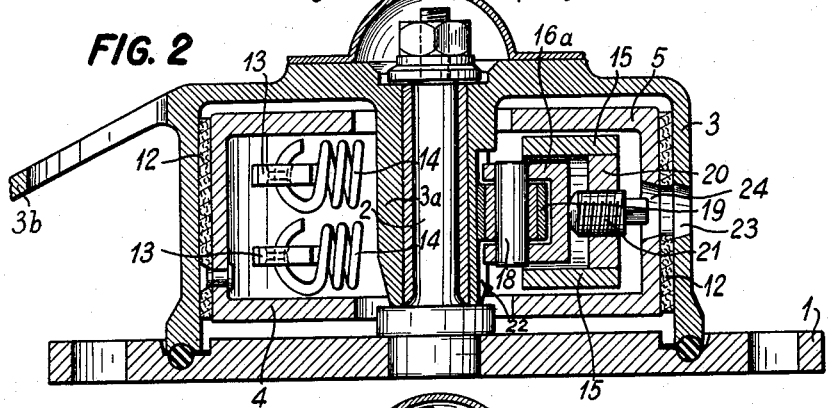
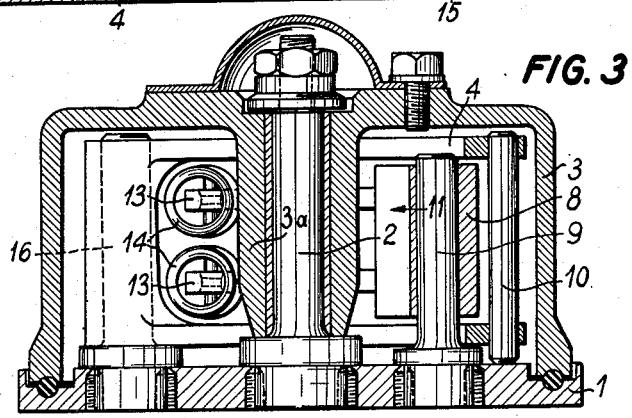
Inventor:
Charles Gaudin
by: J. Delattre-Seguy
Attorney

2,702,610

SHOCK ABSORBER FOR VEHICLES

Charles Gaudin, Saint-Sulpice, Switzerland, assignor of two-thirds to Auguste Ritz, Pully, and René F. Sechaud, Geneva, Switzerland Application January 15, 1954, Serial No. 404,294

Claims priority, application Switzerland August 8, 1953

6 Claims. (Cl. 188—129)

My invention has for its object a shock absorber for vehicles, said shock absorber being of the type comprising a drum and jaw brake whereof either the drum or the brake is carried by the chassis while the other component is associated with an axle of the vehicle, the jaws being pivotally secured through their cooperating ends to a carrier flange to which is pivotally secured a member controlling the spacing of the jaws and inserted between the other ends of the latter, said member being submitted through the agency of elastic means to the action of a central cam angularly rigid with the drum.

According to my invention, the spacing member is rigid with at least one arm to one end of which is secured a coil spring engaging on the other hand one end of a lever the other end of which is pivotally secured to the carrier flange, a roller-carrying strap being pivotally secured to said lever and urging the roller against the central cam; furthermore, a screw is screwed into one of the two following members, the strap and the lever, and engages the other member so that the action of the central cam on the roller is transmitted through the agency of said screw to the lever and from the latter through the agency of the coil spring to the arm rigid with the spacing member whereby the braking effect is caused to be a function of the relative angular position of the drum with reference to the jaws.

Accompanying drawing illustrates by way of example a preferred embodiment of the object of my invention. In said drawing:

Fig. 1 is a sectional view of the shock absorber in a plane perpendicular to its axis.

Fig. 2 is a sectional view through line II—II of Fig. 1.

Fig. 3 is a sectional view through line III—III of Fig. 1.

The shock absorber illustrated includes a carrier flange 1 which is intended to be secured to the chassis or to the axle of a vehicle and which includes a central pivot 2, over which is revolubly mounted the central hub 3a of a coaxial drum 3 rigid with an arm 3b adapted to be connected with the axle or the chassis of the vehicle.

On the carrier flange 1 are furthermore mounted two jaws 4 and 5 which are pivotally secured each through one of its ends 6 or 7, as the case may be, to the flange 1.

A spacing member 8 is fitted between the opposite ends of the jaws, and is revolubly mounted on a pivot 9 rigid with the flange 1. The jaws assume a U-shaped cross-sectional outline and carry each, at its end opposed to the pivotal connection 6 or 7, a pivot 10 fitted between the arms of the U and bearing against one of the two abutment surfaces 11, facing opposite sides, which are formed on the spacing member 8. When said member 8 as seen in Fig. 1 revolves anti-clockwise, it urges away from each other the jaws which carry each a lining 12 frictionally engaging the inner surface of the drum so as to produce the desired braking effect. The spacing member 8 is controlled by the following means; it is rigid with two identical superposed arms 13 each of which is engaged by a coil spring 14 the remote end of which is secured to one of the two superposed arms forming a forked lever 15, which lever arms are pivotally secured to the flange 1 through a common spindle 16. The arms 13 are housed inside the jaw 4 while the lever 15 is housed inside the other jaw 5. A strap 16a, the cross-section of which is U-shaped, is pivotally secured at 17 between the arms of the lever 15 and it carries between its lateral flanges the spindle 18 of a roller 19. The arms of the lever 15 are interconnected by a stay 20 provided with a tapped hole inside which is screwed an adjusting screw 21 bearing against the back of the strap 16a. By reason of this arrangement, the roller 19 is urged against the hub 3a of the drum 3, the periphery of said hub being provided with a recessed section 22 against the bottom of which the roller 19 bears when the shock absorber is inoperative. When the drum revolves with reference to the carrier flange 1, the hub 3a acts as a controlling cam and shifts the roller 19 towards the right hand side of Fig. 1 away from the recess 22. The strap 16a abutting against the screw 21 constrains consequently the lever 15 to revolve anti-clockwise and thereby to drive through the springs 14 the arm 13 in the same direction and in their turn said arms urge the spacing member 8 also in an anti-clockwise direction. The braking action obtained in thus a function of the relative angular position of the drum 3 with reference to the jaws 5.

By acting on the adjusting screw 21, it is possible to relieve the connection between the central cam 3a and the spacing member 8 and this makes the mounting of the shock absorber easier and thenceafter it is possible to reset the screw 21 by an amount such as will properly produce the desired initiating braking action of the jaws when the shock absorber is inoperative. The control of the adjusting screw 21 is allowed through apertures 23 and 24 provided respectively in the walls of the drum 3 and of the jaw 5, said apertures registering with each other when the shock-absorber is inoperative so as to allow at such a moment the introduction therethrough of a tubular wrench or the like instrument for operation of the screw 21.

What I claim is:

1. A shock absorber for a vehicle including a suspended and an unsuspended part, comprising a brake drum, two jaws adapted to cooperate with the surface of said drum, a plate member rigid with one of the two parts of the vehicle, means for pivotally securing the drum to the other part of the vehicle, a cam coaxial with the drum and angularly rigid therewith, a pivot rigid with the plate member perpendicularly thereto and on which the cam is revolubly fitted, two further pivots rigid with the plate perpendicularly thereto and on each of which one end of each jaw respectively is revolubly fitted, a jaw-spacing member pivotally mounted on the plate member and pivotally connected through each end with the other end of each jaw respectively, at least one arm rigid with the spacing member, a coil spring secured through one end to the free end of said arm, a lever pivotally secured through one end to the plate member round an axis perpendicular to the latter and secured to the second end of the coil spring, a strap pivotally secured to the lever at an intermediate point thereof, a roller pivotally secured to the free end of said strap to revolve around an axis parallel with the pivotal axis of the lever and engageable by the cam, and means controlled by the lever urging the roller into permanent contact with the cam and adapted to transmit the radial thrust exerted by the cam on the roller onto the lever and, consequently, onto the spacing member, to urge the jaws towards the drum.

2. A shock absorber for a vehicle including a suspended and an unsuspended part, comprising a brake drum, two jaws adapted to cooperate with the surface of said drum, a plate member rigid with one of the two parts of the vehicle, means for pivotally securing the drum to the other part of the vehicle, a cam coaxial with the drum and angularly rigid therewith, a pivot rigid with the plate member perpendicularly thereto and on each of which the cam is revolubly fitted, two further pivots rigid with the plate perpendicularly thereto and on which one end of each jaw respectively is revolubly fitted, a jaw-spacing member pivotally mounted on the plate member and pivotally connected through each end with the other end of each jaw respectively, two superposed arms parallel with the plate member and rigid with the spacing member, two superposed levers pivotally secured to the plate member through a common axis to extend in planes parallel to that of the plate member, a coil spring connecting each arm with the corresponding lever, a strap pivotally secured between the levers at an intermediate point thereof to revolve around an axis parallel with the pivotal axis of the levers and engageable by the cam, and means controlled by the levers urging the roller into permanent contact with the cam and adapted to transmit the radial thrust exerted by the cam on the roller onto the levers and, consequently, onto the spacing member, to urge the jaws towards the drum.

3. A shock absorber for a vehicle including a suspended and an unsuspended part, comprising a brake drum, two jaws having a U-shaped transverse section to form two sections perpendicular to the axis of the brake drum and adapted to cooperate with the surface of said drum, a plate member rigid with one of the two parts of the vehicle, means for pivotally securing the drum to the other part of the vehicle, a cam coaxial with the drum and angularly rigid therewith, a pivot rigid with the plate member perpendicularly thereto and on each of which the cam is revolubly fitted, two further pivots rigid with the plate perpendicularly thereto and on which one end of each jaw respectively is revolubly fitted, a jaw-spacing member pivotally mounted on the plate member and pivotally connected through each end with the other end of each jaw respectively, two superposed arms parallel with the plate member and rigid with the spacing member, said arms engaging the interval between the sections of one jaw, two superposed levers pivotally secured to the plate member through one end and extending in planes parallel to that of the plate member, said levers engaging the interval between the sections of the second jaw, a coil spring connecting each arm with the corresponding lever, a strap pivotally secured between the levers at an intermediate point thereof to revolve around an axis parallel with the pivotal axis of the levers and engageable by the cam, and means controlled by the levers urging the roller into permanent contact with the cam and adapted to transmit the radial thrust exerted by the cam onto the levers and, consequently, onto the spacing member, to urge the jaws towards the drum.

4. A shock absorber for a vehicle including a suspended and an unsuspended part, comprising a brake drum, two jaws adapted to cooperate with the surface of said drum, a plate member rigid with one of the two parts of the vehicle, means for pivotally securing the drum to the other part of the vehicle, a cam coaxial with the drum and angularly rigid therewith, a pivot rigid with the plate member perpendicularly thereto and on which the cam is revolubly fitted, two further pivots rigid with the plate perpendicularly thereto and on each of which one end of each jaw respectively is revolubly fitted, a jaw-spacing member pivotally mounted on the plate member and pivotally connected through each end with the other end of each jaw respectively, at least one arm rigid with the spacing member, a coil spring secured through one end to the free end of said arm, a lever pivotally secured through one end to the plate member round an axis perpendicular to the latter and secured to the second end of the coil spring, a strap pivotally secured to the lever at an intermediate point thereof, a roller pivotally secured to the free end of said strap to revolve around an axis parallel with the pivotal axis of the lever and engageable by the cam, an adjustable screw threadedly engaging one of the cooperating elements: the lever and the strap, the tip of which engages the cooperating surface of the other element to urge the roller into permanent contact with the cam and adapted to transmit the radial thrust exerted by the cam on the roller onto the lever and, consequently, onto the spacing member, to urge the jaws into a predetermined position with reference to the drum for a predetermined angular position of the jaws with reference to the drum and cam arrangement.

5. A shock absorber for a vehicle including a suspended and an unsuspended part, comprising a brake drum, two jaws adapted to cooperate with the surface of said drum, a plate member rigid with one of the two parts of the vehicle, means for pivotally securing the drum to the other part of the vehicle, a cam coaxial with the drum and angularly rigid therewith, a pivot rigid with the plate member perpendicularly thereto and on which the cam is revolubly fitted, two further pivots rigid with the plate perpendicularly thereto and on each of which one end of each jaw respectively is revolubly fitted, a jaw-spacing member pivotally mounted on the plate member and pivotally connected through each end with the other end of each jaw respectively, two superposed arms parallel with the plate member and rigid with the spacing member, two superposed levers pivotally secured together to the plate member through one end and extending in planes parallel to that of the plate member, a coil spring connecting each arm with the corresponding lever, a strap pivotally secured between the levers at an intermediate point thereof to revolve around an axis parallel with the pivotal axis of the levers and engageable by the cam, a stay interconnecting the two levers and provided with a tapped opening extending radially of the plate member and an adjusting screw threadedly engaging the tapped opening in the stay and the tip of which engages the cooperating surface of the strap to urge the roller into permanent contact with the cam and adapted to transmit the radial thrust exerted by the cam on the roller onto the levers and, consequently, onto the spacing member, to urge the jaws into a predetermined position with reference to the drum for a predetermined angular position of the jaws with reference to the drum and cam arrangement.

6. A shock absorber for a vehicle including a suspended and an unsuspended part, comprising a brake drum, two jaws having a U-shaped transverse section, to form two sections perpendicular to the axis of the brake drum and adapted to cooperate with the surface of said drum, a plate member rigid with one of the two parts of the vehicle, means for pivotally securing the drum to the other part of the vehicle, a cam coaxial with the drum and angularly rigid therewith, a pivot rigid with the plate member perpendicularly thereto and on which the cam is revolubly fitted, two further pivots rigid with the plate perpendicularly thereto and on each of which one end of each jaw respectively is revolubly fitted, a jaw-spacing member pivotally mounted on the plate member and pivotally connected through each end with the other end of each jaw respectively, two superposed arms parallel with the plate member and rigid with the spacing member, said arms engaging the interval between the sections of one jaw, two superposed levers pivotally secured together to the plate member through one end and extending in planes parallel to that of the plate member, said levers engaging the interval between the sections of the second jaw, a coil spring connecting each arm with the corresponding lever, a strap pivotally secured between the levers at an intermediate point thereof to revolve around an axis parallel with the pivotal axis of the levers and engageable by the cam, a stay interconnecting the two levers and provided with a tapped opening extending radially of the plate member, an adjusting screw threadedly engaging the tapped opening in the stay and the tip of which engages the cooperating surface of the strap to urge the roller into permanent contact with the cam and adapted to transmit the radial thrust exerted by the cam on the roller onto the levers and, consequently, onto the spacing member, to urge the jaws into a predetermined position with reference to the drum for a predetermined angular position of the jaws with reference to the drum and cam arrangement, and means extending through the drum and lever-enclosing jaw in register with the location of the tapped opening in the stay to allow adjustment of the screw therethrough.

No references cited.